No. 782,482. PATENTED FEB. 14, 1905.
D. E. BROCKETT.
PIPE COUPLING.
APPLICATION FILED JUNE 2, 1904.
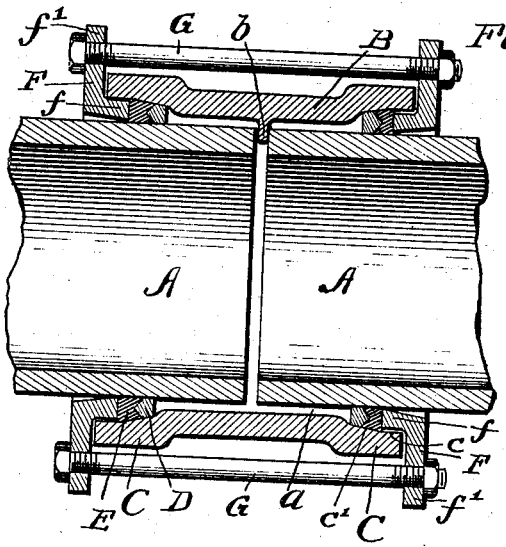
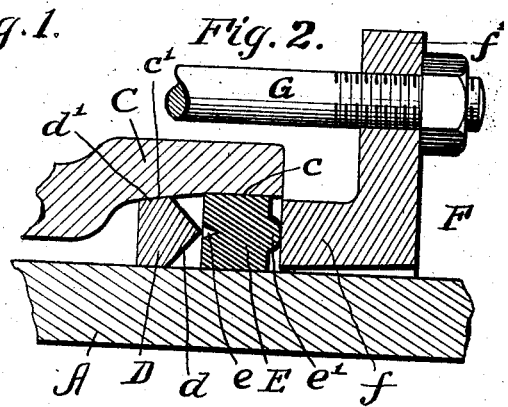
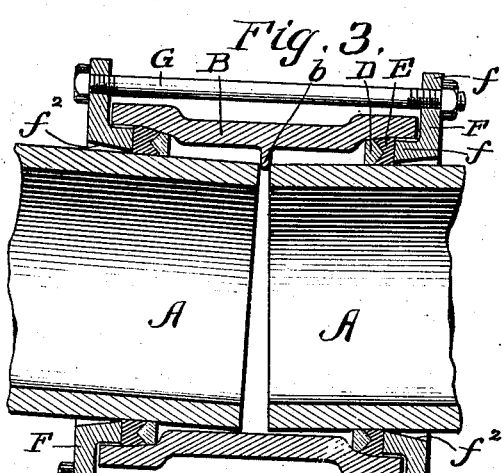
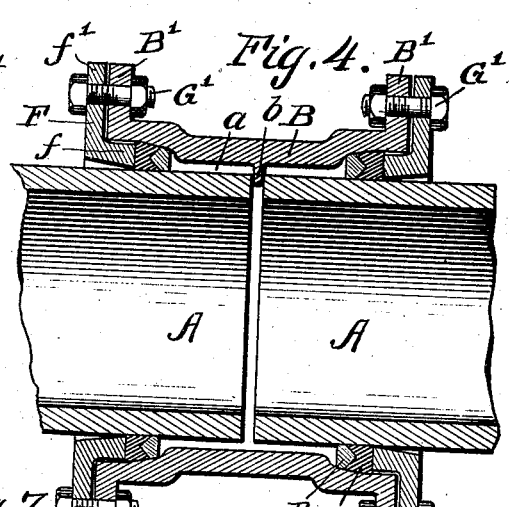
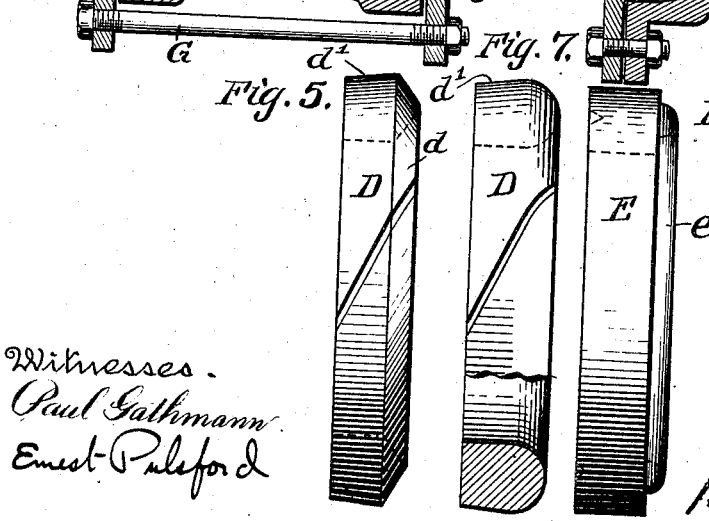
Witnesses.
Paul Gathmann
Ernest Pulsford
Inventor
David E. Brockett.
By his Attorneys
Baldwin & Wight No. 782,482.

Patented February 14, 1905.

UNITED STATES PATENT OFFICE.

DAVID E. BROCKETT, OF EAST LIVERPOOL, OHIO.

PIPE-COUPLING.

SPECIFICATION forming part of Letters Patent No. 782,482, dated February 14, 1905.

Application filed June 2, 1904. Serial No. 210,840.

*To all whom it may concern:*

Be it known that I, DAVID E. BROCKETT, a citizen of the United States, residing at East Liverpool, in the county of Columbiana and State of Ohio, have invented certain new and useful Improvements in Pipe-Couplings, of which the following is a specification.

My invention relates to couplings for connecting the plain or unthreaded ends of pipes; and the object of the invention is to couple pipes easily and quickly and in such manner as to hold them securely, prevent leakage, and relieve the coupling-bolts from undue strain and to also provide means whereby should the joint be "broken over," bent, or moved out of alinement the strain shall be taken by a yielding member and the rigid parts of the coupling devices be relieved from strain.

In carrying out my invention in the pre20 ferred way I provide a coupling-sleeve having bell-mouths at opposite ends and into which the ends of the pipes to be coupled may be easily inserted. Within each bell is arranged a steel split ring that closes the bell at its inner end and having a tapered outer face that engages a gum ring or gasket which is pressed into engagement with the ring by a follower. The followers are formed with annular flanges, which are connected by coupling-bolts, the arrangement being such that when the bolts are tightened the followers press the gaskets against the rings, which in turn are pressed against the inner inclined surfaces of the bells. Preferably each gasket is formed on its inner face with a small annular groove, into which the tapered outer face of the spring-ring projects, whereby the spreading of the gasket is facilitated, and each gasket is also, preferably, formed on its outer face opposite the groove with an annular rib, which greatly promotes the spreading of the gasket at its inner portion, while preventing it from being misshaped at its outer portion. There is no packing between the inner faces of the split rings and the meeting ends of the pipes, and when the pipes with these couplings are used for conveying gases or other fluids the pressure on the inner faces of the rings is such as to tend to force the rings outward against the gaskets and to cause the gaskets to spread laterally against the pipes and their coupling-sleeve, thus tending to firmly hold them and relieve largely the strain on the bolts. The bores of the followers are larger than the pipes and are preferably tapered outward or flared, so that should the pipes bend the spring-rings will be pressed against the sleeve, while no strain is imparted to the followers.

In case of repairing old lines I prefer instead of using long bolts to connect the followers to form flanges on opposite ends of the coupling-sleeve and connect these flanges to the followers by means of short bolts.

Other features of my invention and the details of construction will be hereinafter more particularly referred to.

In the accompanying drawings, Figure 1 shows a vertical central section through a pipe-coupling embodying my invention. Fig. 2 is an enlarged detail view in section thereof. Fig. 3 is a view similar to Fig. 1, but with the meeting ends of the pipes broken over. Fig. 4 is a view similar to Fig. 1, showing a form of coupling for patching old lines. Fig. 5 shows, on an enlarged scale, an elevation of one of the split steel rings employed. Fig. 6 is a similar view of one of the gaskets. Fig. 7 shows a modified form of spring-ring.

The ends of the pipe-sections A are arranged a short distance apart and are inclosed within a coupling-sleeve B, the bore of which is slightly larger than the diameter of the pipes, leaving a small annular space $a$ between the coupling-sleeve and the pipes. By this construction the pipes can be easily and quickly inserted into the coupling-sleeve, whereas if they were made a close fit with the bore of the coupling-sleeve there would often be difficulty in assembling the parts. On its inner side midway between its ends the coupling-sleeve is formed with a lug $b$, which acts as a gage to limit the endwise movement of the pipe-sections when they are inserted and to cause their ends to meet midway between the ends of the coupling-sleeve. The coupling-sleeve is formed at each end with a bell-mouth C, which is preferably made straight at $c$ and tapered at $c'$, as indicated most clearly in Fig.

2. Within each bell is arranged a split steel ring D and a rubber ring or gasket E. The ring D is formed with an annular tapered outer face $d$, and the gasket E is formed with an annular groove $e$ on its inner face opposite the tapered outer face $d$ of the ring, as indicated in Fig. 2. Each gasket is also formed on its outer face opposite the groove $e$ with an annular rib $e'$. The gaskets and rings are forced home into the bells by followers F, having annular inwardly-projecting flanges $f$ and annular outer flanges $f'$, which are connected by clamping-bolts G.

When the pipe-sections and couplings are assembled, the parts will be in the position indicated in Fig. 2, in which position it will be observed that the rings D close the inner ends of the bells where they join the space $a$. If now the bolts be tightened, the followers will press the gaskets against the split rings, the tapered faces $d$ of the rings entering the grooves $e$ of the gaskets, and as the followers are drawn in the gaskets will be spread against the side walls of the pipes and the coupling-sleeve and the gaskets will enter the tapered portions $c'$ of the bells. When the followers are drawn inward to their full extent, the ribs $e'$ will be pressed flat, while the grooves $e$ will be widened in the manner indicated in Fig. 1. The gaskets are made to fit tightly the walls of the coupling-sleeve and the pipes, and the bolts are thus relieved from considerable strain. If the ribs $e'$ were omitted, the gaskets would not so efficiently spread and press against the coupling-sleeve and pipe-sections; but these ribs provide surplus material, which allows the gaskets to be spread by the rings D in a manner properly to cause a tight fit between the coupling-sleeve and pipes.

It will be observed that there is no packing between the inner faces of the rings and the meeting ends of the pipes. Therefore when the pipes are used for conveying gases or other fluids under pressure there will always be a pressure of gas against the inner faces of the rings, which tends to press them into engagement with the gaskets. This I consider an important feature of my invention. Any tendency to leak results in a further compression of the gaskets and the tighter connection thereof with the coupling-sleeve and pipes.

It will be observed by reference to Fig. 3 that the openings in the followers which receive the pipes are tapered or flared at $f^2$, so that when the joint is broken over or tilted, as indicated, no lateral strain is exerted on the followers; but the resulting pressure is imparted to the split rings and the gaskets are further compressed.

In Fig. 4 I have shown a construction similar in all respects to that before described, except that the coupling-sleeve is formed with annular flanges B', which are connected to the flanges of the followers by short bolts G'.

This form of coupling is especially intended for use in repairing old lines where the coupling is long and where it is not desirable to use long bolts.

As shown in Fig. 2 and Fig. 5, the periphery of the rings D is preferably slightly tapered at $d''$, so as to fit the inclined walls $c'$, so that as the rings are driven inward they are slightly compressed. Thus the rings automatically adapt themselves to their seats in the bells either while being inserted or when pressed outward by the fluid-pressure. In Fig. 7 the ring D is shown as having a curved or rounded outer face; but I prefer to make the outer face of the ring sharply inclined, as shown in other figures of the drawings.

I claim as my invention—

1. A coupling for the plain or unthreaded ends of pipes, comprising a coupling-sleeve formed at opposite ends with bells, expansible rings at the inner ends of the bells and which closely fit the bells, gaskets engaged by the outer faces of the rings and followers for forcing the gaskets against the rings.

2. A coupling for the plain or unthreaded ends of pipes, comprising a coupling-sleeve formed at its opposite ends with bells, expansible rings at the inner ends of the bells having tapered outer faces, gaskets engaged by the tapered faces of the rings and followers for forcing the gaskets against the rings.

3. A coupling for the plain or unthreaded ends of pipes, comprising a coupling-sleeve formed at its opposite ends with bells, rings at the inner ends of the bells having tapered outer faces, gaskets engaging the tapered faces of the rings and having annular grooves to receive the tapered faces of the rings and means for forcing the gaskets against the rings.

4. A coupling for the plain or unthreaded ends of pipes, comprising a coupling-sleeve formed at its opposite ends with bells, rings at the inner ends of the bells having tapered outer faces, gaskets engaging the tapered faces of the rings having grooves to receive the rings and ribs opposite the grooves and means for forcing the gaskets against the rings.

5. A pipe-coupling comprising a coupling-sleeve, a ring having a tapered outer face, a gasket having a groove on one side to receive the ring and a rib on the opposite side, and means engaging the ribbed side of the gasket and forcing it against the ring.

6. A coupling for the plain or unthreaded ends of pipes, comprising a coupling-sleeve formed at its opposite ends with bells having tapered inner walls, split rings having tapered peripheries fitting the tapered walls of the bells, grooved gaskets engaging the rings, and means for forcing the gaskets against the rings.

7. A coupling for the plain or unthreaded ends of pipes, comprising a coupling-sleeve formed at opposite ends with bells having tapered inner walls, rings having tapered peripheries fitting the tapered walls of the bells, gaskets having grooves to receive the rings, and ribs opposite the grooves, and means for forcing the gaskets against the rings.

8. A coupling for the plain or unthreaded ends of pipes, comprising a bell-mouthed coupling-sleeve, an automatically-expanding ring within the bell, a grooved gasket engaging the ring, and a follower for driving the gasket against the ring.

9. A coupling for the plain or unthreaded ends of pipes, comprising a coupling-sleeve formed at opposite ends with bells, packing within the bells, and followers for pressing the packing home having openings to receive the pipe-sections, and walls which are tapered or flared for the purpose specified.

10. A coupling for the plain or unthreaded ends of pipes, comprising a bell-mouthed coupling-sleeve, an expansible ring arranged at the inner end of the bell, a gasket engaging the ring, and a follower for pressing the gasket against the ring having a tapered bore for the purpose specified.

11. A coupling for the plain or unthreaded ends of pipes comprising a coupling-sleeve surrounding the meeting ends of the pipes having an annular unpacked space or chamber between it and the pipes and provided with bells at opposite ends of said chamber, expansible metallic rings arranged at the inner ends of the bells and closing the ends of said chamber, packing-rings or gaskets engaging the outer faces of the rings and means for forcing the packing against the rings.

12. A coupling for the unthreaded ends of pipes, comprising a coupling-sleeve having bells at opposite ends, expansible spring-rings at the inner ends of the bells having tapered outer faces engaging the inclined walls thereof, gaskets engaging the outer faces of the rings and means for forcing the gaskets against the rings.

13. A coupling for the unthreaded ends of pipes, comprising a bell-mouthed coupling-sleeve, an automatically-adjustable spring-ring at the inner end of the bell having a tapered outer face, a gasket outside the ring and a follower for forcing the gasket against the ring.

14. A pipe-coupling comprising a bell-mouthed coupling-sleeve fitted loosely on the meeting ends of the pipes, and having an annular unpacked chamber between it and the pipes, means for closing this chamber at one end of the coupling-sleeve, an automatically-adjustable split ring closing the opposite end of said chamber, a gasket engaging the outer face of the ring and a follower for forcing the gasket home.

In testimony whereof I have hereunto subscribed my name.

DAVID E. BROCKETT.

Witnesses:
LLOYD B. WIGHT,
K. H. FENNING.